United States Patent

[11] 3,614,226

[72] Inventor Ronald A. Vergoz
 Allendale, N.J.
[21] Appl. No. 807,667
[22] Filed Mar. 17, 1969
[45] Patented Oct. 19, 1971
[73] Assignee Holobeam, Inc.
 Paramus, N.J.

[54] PHASE-LOCKED PULSED DISTANCE-MEASURING EQUIPMENT UTILIZING A COARSE SCALE AND FINE SCALE MEASUREMENT
5 Claims, 1 Drawing Fig.

[52] U.S. Cl. .................................................. 356/5,
 356/4, 343/12
[51] Int. Cl. ..................................................... G01c 3/08
[50] Field of Search ........................................... 356/5, 4;
 343/13

[56] References Cited
UNITED STATES PATENTS
3,298,024 1/1967 Böhm ........................ 343/12

Primary Examiner—Richard A. Farley
Assistant Examiner—J. M. Potenza
Attorney—Sandoe, Hopgood and Calimafde ABSTRACT: An electromagnetic distance-measuring device wherein the time of transit of signals to and from a target is measured to determine a coarse scale distance to the target. An additional fine scale measurement of the distance to the target is provided by measuring the phase shift of the returned signal. The reflected energy, when received, triggers a counter to provide the coarse time measurement. The fine scale increment is provided by measuring the phase shift of the returned signal relative to a high-frequency control signal.

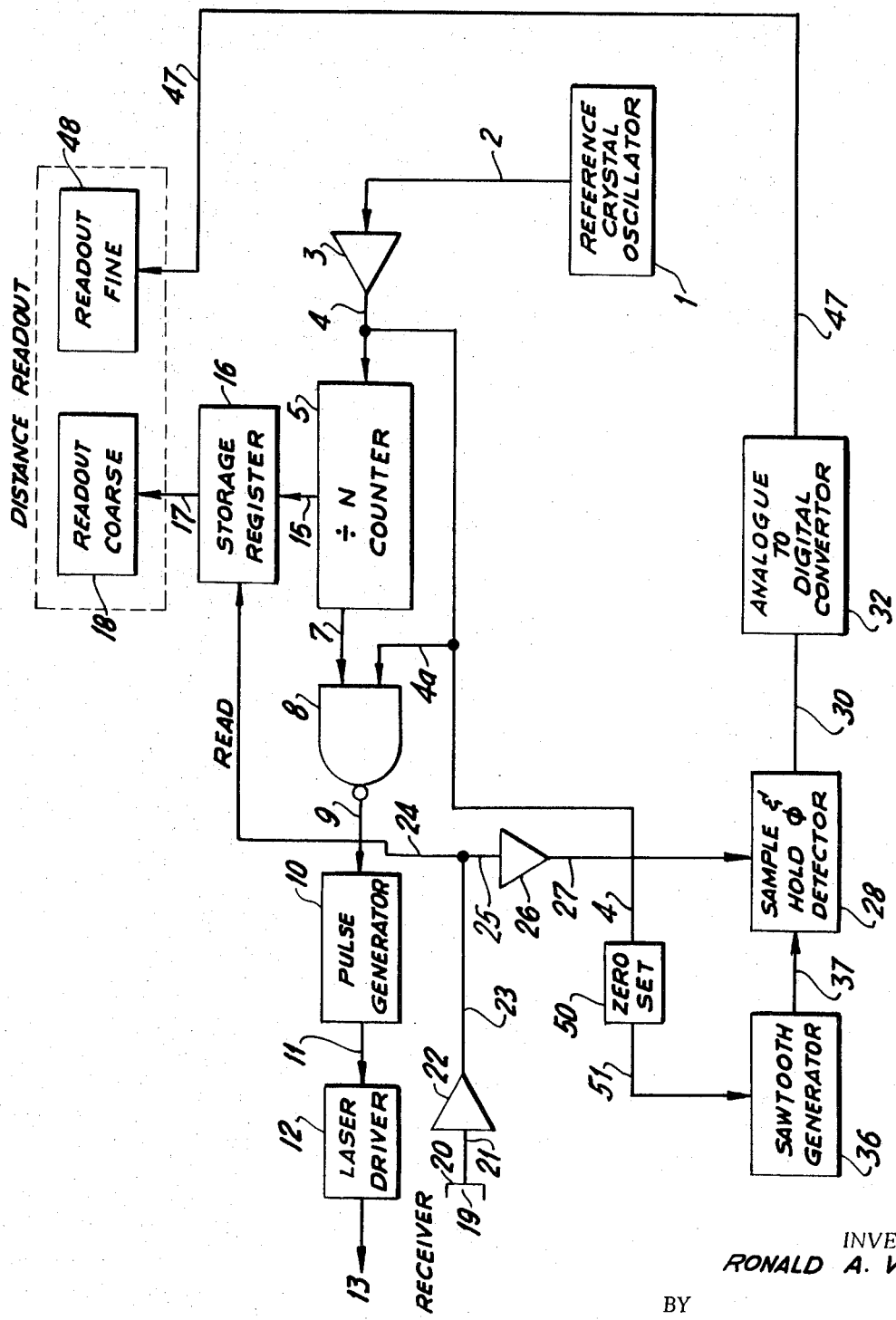

3,614,226

PHASE-LOCKED PULSED DISTANCE-MEASURING EQUIPMENT UTILIZING A COARSE SCALE AND FINE SCALE MEASUREMENT

BACKGROUND

The invention is in the field of range-finding devices wherein electromagnetic signals are reflected from targets and their time of transit measured to determine the distance to the target.

In the invention electromagnetic energy is pulsed through an air or liquid medium at an audio rate. The reflected pulse is received, amplified and processed along two paths. The return pulse is first utilized to read a storage register which detects the state of a counter which is initiated by the transmitted signals, and records time as distance to the target in coarse integral steps.

Second, the returning signal is utilized in a phase comparator to determine the phase difference between the transmitted and received signals. The analogue output voltage of this comparator is converted to a digital signal through an analog to digital converter, into the fine scale readout.

The change in phase of the received signals is a measure of the fine scale distance to the target which when added to the coarse scale distance gives a precise distance measurement.

An objective of the invention is to provide an electromagnetic echo-ranging distance-measuring device, wherein the phase change of interrogating signals reflected from a target is precisely measured to provide a highly accurate measurement of the distance to the target.

Another objective of the invention is to provide a range-finding device capable of operating with a transmitter having a low-average power output.

A further objective of the invention is to provide a distance-measuring system capable of use with a laser range finder.

A still further objective of the invention is to provide a range finding device capable of operating with a transmitter having a high-peak power, but providing the accuracy of a CW signal.

SUMMARY

Basically, the invention is comprised of means to transmit pulse-type electromagnetic signals with a pulse repetition rate within the audio range, but a capability of obtaining accuracy of a CW signal. Receiver means intercepts portions of said signals reflected from a target, which signals trigger a counter which measures the time in transit of said pulses and actuates a coarse distance readout. A phase comparator means compares the phase of the returning signals with that of a control signal generated by a reference crystal oscillator and generates an output representative of the fine scale distance to a target. The reference crystal oscillator generates the high-frequency control signal which serves as the reference signal by which the phase shift of the received signals is measured. An analogue to digital converter converts the output of the phase comparator to a digital output which actuates readout means to provide a visual indication of the fine scale increment of the distance to the target.

The following are some of the advantages offered by the invention.

The low-pulse repetition rate provides a means for eliminating the ambiguities resulting in the analysis of high frequency periodic waveforms. The low pulse rate also allows use of high-peak-pulse power systems with a low-average power transmitter; and, by establishing the control frequency output of the reference crystal oscillator at a high frequency, such as 5 megacycles, a finer resolution can be obtained than with a simple pulse delay system.

BRIEF DESCRIPTION OF THE DRAWINGS

FIG. 1 is a schematic diagram of a range-finding device of the invention.

DETAILED DESCRIPTION OF A PREFERRED EMBODIMENT OF THE INVENTION

FIG. 1 is a schematic diagram of a range finder constructed according to the teachings of the invention. A reference crystal oscillator 1 generates a clock-rate control signal 2. Clock signal 2 is fed to an amplifier 3 where it is amplified and a portion 4 thereof is fed to a divide-by-$n$ counter 5 where each cycle of the control signal is recorded from a time zero. One output 7 of the divide-by-$n$ counter 5 is a signal having a frequency equal to that of the control signal divided by $n$. Output 7 is delivered to an AND-gate 8 to become part of an input 9 which actuates a pulse generator 10. The output 11 of pulse generator 10 triggers a laser driver 12 causing the transmission of electromagnetic interrogation signals 13.

A second output 15 from divide-by-$n$ counter 5, actuates a storage register 16 at the clock-rate control frequency 2 to record the passage of time between the transmission of signals 13, and the reception of reflected signals 19 produced by the reflections of the transmitted signals 13 from a target. Storage register 16 is triggered in response to incoming signals 19 causing an output 17 to actuate a first digital readout 18, which indicates the distance to the target in coarse units determined by control frequency 2.

A receiver 20 picks up portions of reflected signals 19 within the detection range of the device. The output 21 of receiver 20 is fed to an amplifier 22. The output 23 of amplifier 22 is divided into two parts; a first portion 24 is delivered to storage register 16 and triggers the same resulting in output signal 17 passing to readout 18 as previously described. A second portion of the output signal 23 of amplifier 22 is fed to a second amplifier 26. The output 27 of amplifier 26 is supplied to a sample-and-hold phase detector 28. A portion of the amplified control signal output 4 from amplifier 3 is coupled to the input of a zero-set circuit 50 which introduces a phase shift to the amplified control signal. The output 51 of zero-set circuit 50 is coupled to and actuates a sawtooth generator 36. The output 37 of the sawtooth generator 36 is fed into and sampled by the sample-and-hold detector 28. The output 30 of sample-and-hold detector 28 which represents the phase difference between the received signals 19 and control signal 4, is fed to an analogue to digital converter 32. The output 47 of an analogue to digital converter 32 actuates a second digital readout 48, which indicates distance to the target in addition to that appearing on readout 18, as a fraction of the time-distance units established by control frequency 2.

With the output signals 13 directed at a target at zero range, readout 48 can be adjusted to zero by adjusting zero set unit 50 and output signal 51 so that the phase of control signal 4 corresponds to 0 volts at the output 30 of sample-and-hold detector 28.

In the device described above, if a reference crystal oscillator, having an output frequency of 5 megacycles, is used to drive a divide-by-$n$ counter of 5,000, the output 7 of counter 5 will have a pulse repetition frequency of 1,000 cycles. As the speed of light through air is approximately $3 \times b \, 10^8$ meters per second, and the propagation delay of light is approximately 1 millisecond for 300,000 meters, it will take a transmitted light pulse 1,000 microseconds to traverse a round trip path of 300,000 meters. During that 1,000 microsecond time period, storage register 16 will go through 5,000 discrete count states. An object between 0 and 1,500 meters distance, will reflect a pulse back to the receiver before the count of 5,000 is reached. Portion 24 of the received pulse is used to decode the exact state of the storage register when the signal is received. In this manner, the 300,000 meter round trip distance can be divided into 5,000 parts of 60 meters each. Readout 18 will thus record the distance to the target in 60-meter increments.

By measuring the phase shift of the interrogating signals, the range to a target can be refined to a fraction of the aforementioned 60 meters, in the following manner. The amplified reference signal 4 provides the reference frequency for sawtooth generator 36 which provides an input 37 to sample-and-hold phase detector 28. The amplified portion 27 of the received signal provides the pulse to sample the sawtooth phase detector; therefore, only one in every $n$ sawtooth waveforms will be sampled. The output of the phase detector 28 is then converted to a digital readout of the fine incremental distance.

The magnitude of the error voltage 30 represents the position of the target within the 60-meter unit of coarse readout 18. The accuracy will be limited by the stability of the crystal reference oscillator 42, which can be good to one part in $10^{10}$, and the linearity of the sawtooth generator 36. Error voltage 30 is a DC voltage, and if it is converted to a frequency readout with an accuracy of one part in $10^4$, the 60-meter unit can be resolved to 0.06 meters.

While the principles of the invention have been described in connection with the above specific apparatus, it is to be clearly understood that this description is made only by way of example and not as a limitation to the scope of the invention.

What is claimed is:

1. A distance-measuring device comprising means for directionally transmitting an interrogating signal, including a series of pulses of electromagnetic energy, toward a target area,
    means for receiving portions of said interrogating signals reflected by targets within the target area,
    means coupled to said receiving means for selectively measuring the time of transit of said interrogating signals to and from the target,
    means coupled to said time-measuring means for displaying the measured time of transit as a coarse scale distance to the target,
    means coupled to said receiving means and including a sawtooth wave signal generator means responsive to a control signal to generate a sawtooth voltage output at the frequency of said control signal and
    a sample-and-hold phase comparator one input to which is coupled to the output of said sawtooth wave generator, and responsive to a second input comprised of said received reflected portion of said interrogating signals for determining the phase shift in the reflected portions of said interrogating signals between the time of transmission and the time of reception of said signals, and
    means coupled to said phase-shift-determining means for displaying said phase shift as a fine scale portion of the distance to the target.

2. The device of claim 1 further including analogue to digital converter means coupled to the output of said sample-and-hold phase comparator to convert the voltage output thereof into a digital output equivalent, and
    means within the audio frequency range.

3. A pulse delay distance-measuring device, comprising:
    means for directionally transmitting interrogating signals comprised of pulses of electromagnetic energy,
    means for receiving portions of said interrogating signals reflected by a target within a selected range,
    means coupled to said receiving means for selectively measuring the time of transit of said interrogating signals to and from the target,
    means coupled to said time-measuring means for displaying said time of transit as a coarse scale distance to the target,
    reference frequency generator means coupled to said transmitting means for supplying a clock-rate control signal to said transmitter means, divide-by-$n$ counter means coupled between said reference frequency generator means and said transmitter means, the value of $n$ being such as to render the pulse rate of said transmitter means within the audio frequency range,
    phase detector means coupled to said receiving means and said reference frequency generator means and responsive to said control signal and said reflected signals for detecting a phase difference therebetween and for providing an output representative thereof, and
    means responsive to the output of said phase detector means for displaying a fine scale distance readout to the target.

4. The device of claim 3 further including a storage register responsive to said clock-rate control frequency and said received reflected signals to record the time of transmit of said interrogating signals to and from a target, and
    wherein said coarse scale distance display means is responsive to an output of said storage register.

5. The device of claim 1 further including zero-set means having one input comprising said control signal, and an output comprising the control signal input to said phase detector means.

UNITED STATES PATENT OFFICE
CERTIFICATE OF CORRECTION

Patent No. 3,614,226  Dated October 19, 1971

Inventor(s) Ronald A. Vergoz

It is certified that error appears in the above-identified patent and that said Letters Patent are hereby corrected as shown below:

Column 4, line 8, "means within the audio frequency range" should read -- coupled to said convertor and responsive to said digital output for providing a visual readout of the fine scale distance to the target --; line 40, the claim reference numeral "1" should read -- 3 --.

Signed and sealed this 29th day of August 1972.

(SEAL)
Attest:

EDWARD M. FLETCHER, JR.　　　　　　　　ROBERT GOTTSCHALK
Attesting Officer　　　　　　　　　　　　Commissioner of Patents